T. McGIRR.
Measuring Faucet.
No. 48,296.
Patented June 20, 1865.
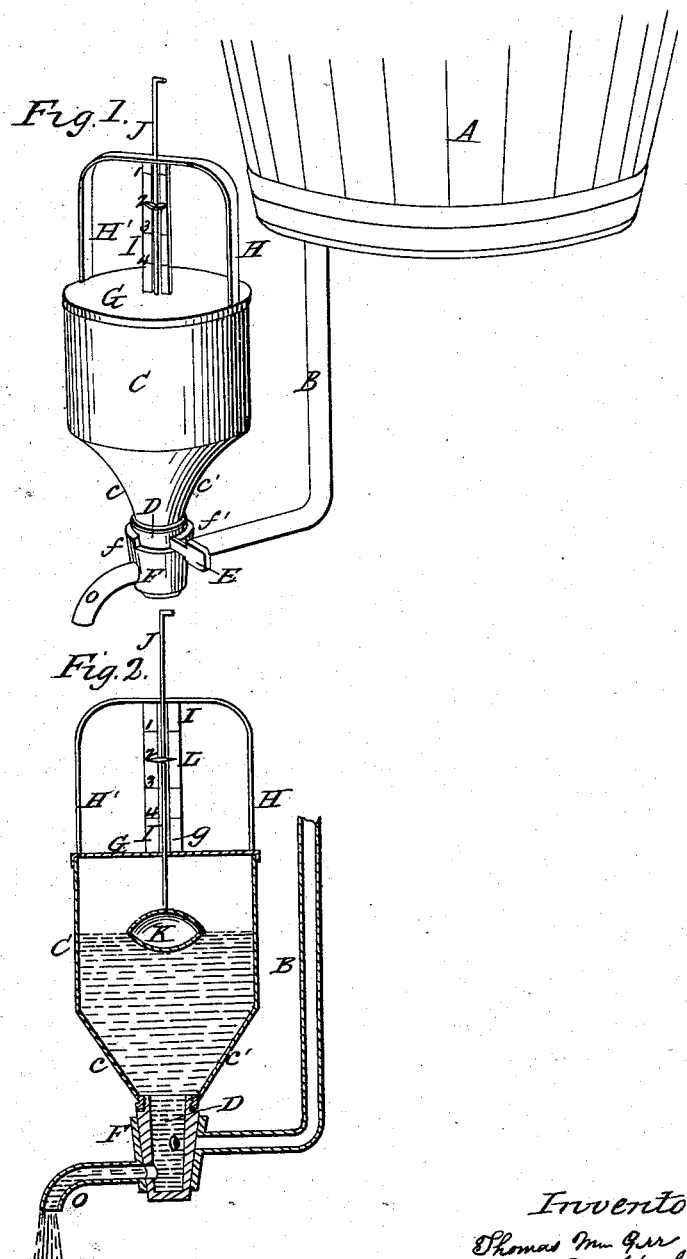

UNITED STATES PATENT OFFICE.

THOMAS McGIRR, OF RICHMOND, INDIANA, ASSIGNOR TO HIMSELF AND NICHOLAS R. NIXON, OF SAME PLACE.

IMPROVEMENT IN MEASURING-FAUCETS.

Specification forming part of Letters Patent No. 48,296, dated June 20, 1865.

*To all whom it may concern:*

Be it known that I, THOMAS McGIRR, of Richmond, Wayne county, and State of Indiana, have invented a new and useful Improvement in Measuring-Faucets; and I do hereby declare the following to be a full, clear, and exact description thereof, reference being had to the accompanying drawings, making part of this specification.

My invention consists in the addition of a cover to the measuring-chamber or meter of measuring-faucets, in combination with a scale or gage attached to the cover, which indicates the quantity of fluid drawn from the meter.

Figure 1 is a perspective view of a measuring-faucet embodying my improvements. Fig. 2 is an axial section through the same.

A is a vessel from which the fluid is drawn, and is connected to the measuring apparatus by a tube or pipe, B.

C is a cylindrical measuring-chamber or meter, having a converging bottom, $c\ c'$, which is attached to the plug of a two-way cock, D. The cock D is rotated by the handle E, and is prevented from turning too far by the shoulders $f f'$ on the upper portion of the valve-shell F.

G is the cap or cover of the measuring-chamber, and is provided with standards $H H'$, which support a slotted scale or gage, I. The scale I rises vertically from the center of the cover G, and has marked on it a series of equidistant lines, which may indicate half-pints, pints, quarts, or gallons, according to the capacity of the measuring-chamber C.

I is a rod or stem attached to the float K, which rests on the surface of the fluid in the measuring chamber. The rod J passes through an aperture, $g$, in the cover G, and has a finger, L, which traverses the slot in the scale I, and the finger is elevated or depressed as the fluid rises or falls in chamber C.

O is the discharge-pipe of the faucet.

Operation: The handle E, being turned to the right until it strikes the shoulder $f'$, opens communication between the vessel A and chamber C, and when the latter is filled the handle is turned to the left until it is about midway between the shoulders $f$ and $f'$, which stops the flow of liquid into the chamber, and also prevents it from flowing out of the delivery-pipe O.

When it is desired to draw any definite quantity from the measuring-chamber the revolution of the handle E to the left is continued until it strikes the shoulder $f$, when the fluid escapes through the discharge-pipe O. As the fluid is drawn from the chamber the float K falls with it, and when the finger L indicates the desired quantity a half-turn of the handle E to the right arrests the flow from the chamber C, and the remaining fluid, if any, can be served to the next customer. The cover G serves to keep the measuring-chamber free from dust and dirt, which would impair the working of the cock, and also excludes flies, roaches, and other vermin.

I do not claim a measuring-faucet nor a float-indicator; but

What I do claim is—

The combination and arrangement of the float K, stem J, scale I, finger L, all substantially as shown and described.

In testimony of which invention I hereunto set my hand.

THOMAS McGIRR.

Witnesses:
GEO. H. KNIGHT,
SAML. BELLIS.